United States Patent [19]

Gleria et al.

[11] Patent Number: 5,260,103
[45] Date of Patent: Nov. 9, 1993

[54] POLYPHOSPHAZENE DERIVATIVES CONTAINING CARBONYL GROUPS AND VARIOUSLY ALKYLATED TERTIARY AMINO GROUPS

[75] Inventors: Mario Gleria, Padua; Francesco Minto, Mestre; Lucia Flamigni, Casalecchio di Reno, all of Italy

[73] Assignee: Consiglio Nazionale Delle Ricerche, Rome, Italy

[21] Appl. No.: 553,417

[22] Filed: Jul. 17, 1990

[30] Foreign Application Priority Data

Jul. 25, 1989 [IT]  Italy ............................... 21293 A/89

[51] Int. Cl.$^5$ ..................... B05D 3/06; C08G 79/02
[52] U.S. Cl. ................... 427/520; 528/399; 528/400; 552/209; 552/294; 558/12; 558/14; 558/132; 558/200; 558/201; 564/12; 564/14
[58] Field of Search ............. 552/209, 294; 528/399, 528/400; 564/12, 14; 558/70, 132, 199, 200, 201

[56] References Cited

U.S. PATENT DOCUMENTS

| | | | |
|---|---|---|---|
| 3,844,983 | 10/1974 | Reynard et al. | 528/399 |
| 4,237,263 | 12/1980 | Allcock et al. | 564/12 |
| 4,242,499 | 12/1980 | Allcock et al. | 552/209 |
| 4,495,174 | 1/1985 | Allcock et al. | 564/12 |

OTHER PUBLICATIONS

Abrahart, Dyes and Their Intermediates, 1968, p. 9.
H. R. Allcock, "Poly(organophosphazenes)-Unusual New High Polymers", Angew. Chem. Int. Ed. Engl. 16, 147 (1977).
H. R. Allcock, "Poly(organophosphazenes)", Chem. Tech. (1975)-5-pp.
H. R. Allcock, "Polymerization of Cyclic Phosphazenes", Polymer 21,673 (1980).
H. R. Allcock, "Polyphosphazenes, and the Inorganic Approach to the Polymer Chemistry", Sci. Prog. Oxf. 66,355 (1980).
H. R. Allcock, "Controlled Synthesis of Organic-Inorganic Polymers taht possess a Backbond of Phosphorous and Nitrogen Atoms", Macromol. Chem. Suppl. 4, 3 (1981).
G. L. Hagnauer, "Polydichlorophosphazene Polymerization Studies", J. Macromol. Sci.-Chem. A16, 385 (1981).
M. Gleria, "Poli(organofosfazeni): Struttura, Applicazioni, Prospettive", Chim. Ind. (Milan), 70 (1988), Suppl. to No. 11, p. 15.
H. R. Allcock, "Poly(organophosphazenes)", Encyclopedia of Polymer Science and Technology, Mark H. F., Bikales N. M., Overberger C. G., Menges G., Kroschwitz J. I. Editors, Wiley, New York 1988, 13, 31.
H. R. Allcock, "Inorganic Macromolecules", Chem. Eng. News 22 (1985).

*Primary Examiner*—C. Warren Ivy
*Assistant Examiner*—Raymond Covington
*Attorney, Agent, or Firm*—Birch, Stewart, Kolasch & Birch

[57] ABSTRACT

Polyphosphazene derivatives containing carbonyl groups and variously alkylated tertiary aminic groups, suited to undergo rapid and efficient photo-crosslinking processes and having general formula:

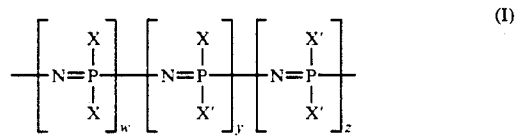

(I)

wherein:
X represents substituents linked to the polyphosphazene chain by means of hydroxylic or aminic functions and containing carbonyl groups;
X' represents additional substituents linked to the polyphosphazene chain by means of hydroxylic or aminic functions and containing one or more variously alkylated tertiary aminic groups;
(w+y+z) is an integer ranging from 20 to 15,000;
w and z are integers having a value higher than or equal to zero and at any rate lower than 15,000;
y is an integer having a value of from 20 to 15,000.

1 Claim, 1 Drawing Sheet

POLYPHOSPHAZENE DERIVATIVES CONTAINING CARBONYL GROUPS AND VARIOUSLY ALKYLATED TERTIARY AMINO GROUPS

FIELD OF THE INVENTION

The present invention relates to polyphosphazene derivatives suited to undergo rapid and efficient cross-linking processes when they are irradiated in the state of thin films by ultra-violet and visible radiations.

BACKGROUND OF THE INVENTION

Methods for preparing polyphosphazene derivatives containing, linked to the phosphorus atoms, alkoxyl, fluoroalkoxyl, aryloxyl and aminic groups, either substituted or non-substituted, are described in prior publications, such as for example:

a) H. R. Allcock, "Phosphorus-Nitrogen Compounds", Academic Press, New York, 1972;
b) H. R. Allcock, "Poly(organophosphazenes)-Unusual New High Polymers", Angew. Chem. Int. Ed. Engl. 16,147 (1977);
c) H. R. Allcock, "Poly(organophosphazenes)", Chem. Tech. (1975)-5-pages 552/560;
d) H. R. Allcock, "Polymerization of Cyclic Phosphazenes", Polymer 21,673 (1980);
e) H. R. Allcock, "Polyphosphazenes, and the Inorganic Approach to the Polymer Chemistry", Sci. Prog. Oxf. 66,355 (1980);
f) H. R. Allcock, "Controlled Synthesis of Organic-Inorganic Polymers that possess a Backbone of Phosphorus and Nitrogen Atoms", Macromol. Chem. Suppl. 4, 3(1981);
g) G. L. Hagnauer, "Polydichlorophosphazene Polymerization Studies", J. Macromol. Sci.-Chem. A16, 385(1981);
h) H. R. Allcock, "Inorganic Macromolecules", Chem. Eng. News 22(1985);
i) M. Gleria, "Poli(organofosfazeni): Struttura, Applicazioni, Prospettive", Chim. Ind. (Milan), 70(1988), Suppl. to No. 11, page 15;
l) H. R. Allcock, "Poly(organophosphazenes)", Encyclopedia of Polymer Science and Technology, Mark H. F., Bikales N. M., Overberger C. G., Menges G., Kroschwitz J. I. Editors, Wiley, New York 1988, 13, 31.

Said publications illustrate, furthermore, the very wide possibilities of practical use, both commercial and industrial, of the cyclic and polymeric phosphazene derivatives. A few of said publications describe the synthesis of polyphosphazenes having general structure of type (I), where y and z are equal to zero, i.e. containing only ketonic (aliphatic, aromatic or alkyl-aromatic) groups or quinone groups. However, no publication has described or suggested, so far, the synthesis of polyphosphazene materials of general formula (I) wherein y and z are different from zero and the ketonic or quinone groups represented by substituents X are present in the phosphazene nucleus along with other substituent groups of the alkoxyl, aryloxyl or aminic type containing variously alkylated tertiary aminic groups, represented in the formula by substituents X'. Furthermore, no publication describes or suggests the use of the polyphosphazenes represented by general formula (I) as materials suited to undergo rapid and efficient photo-crosslinking processes and, therefore, to exhibit the capability of being used as non-conventional systems (i.e. not based on the use of silver halides) for the image reproduction, or applicative possibilities in microelectronics for the preparation of printed circuits, in microlithography, etc.

SUMMARY

The present invention relates to polyphosphazene derivatives containing carbonyl groups and variously alkylated tertiary aminic groups, suited to undergo rapid and efficient photo-crosslinking processes when they are exposed, in the state of films, to ultraviolet and visible radiations, and having general formula (I):

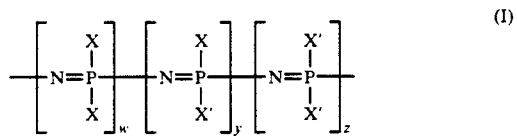

in which:

X represents substituents linked to the polyphosphazene chain by means of hydroxylic or aminic functions, and containing carboxylic groups;

X' represents additional substituents linked to the polyphosphazene chain by means of hydroxylic or aminic functions and containing one or more variously alkylated tertiary aminic groups;

$(w+y+z)$ is an integer which varies from 20 to 15,000, w and z are integers having a value higher than or equal to zero and at any rate lower than 15,000;

y is an integer having a value ranging from 20 to 15,000.

In order to impart the maximum effectiveness to the product in the photo-crosslinking process, the $y/(y+w+z)$ ratio has a value which is as close as possible to one.

The derivatives according to the present invention are prepared through a process which utilizes, as reagents to give substituents X and X', compounds containing hydroxyl or aminic groups and is characterized in that, when said compounds contain hydroxyl groups, these compounds, dissolved in an organic solvent, are reacted with sodium hydride in a stoichiometric amount, and the sodium salts so produced are reacted with polydichlorophosphazene of general formula:

$(NPCl_2)_n$ wherein n is an integer ranging from 20 to 15,000, optionally in the presence of a tetraalkylammonium halide and, when said compounds contain hydroxylic or aminic groups, they are reacted with polydichlorophosphazene in the presence of a tertiary amine in a reaction medium consisting of an organic solvent in which both the starting reacting species and the final polyphosphazene derivatives are soluble.

DETAILED DESCRIPTION OF THE INVENTION

Figure 1:
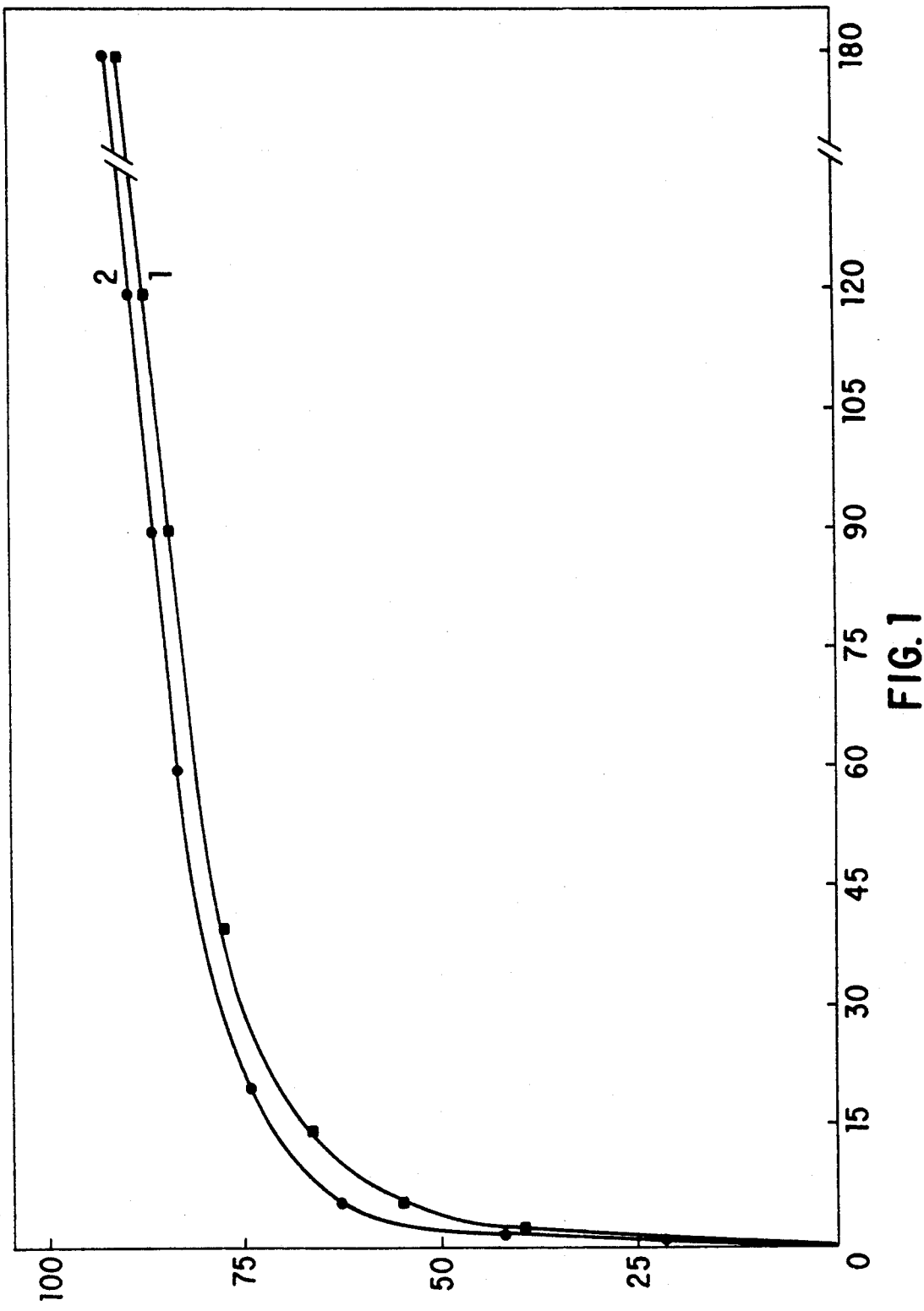

The characteristics of the polyphosphazene derivatives according to the invention and of the process for preparing them will be better apparent from the following detailed description.

Said derivatives have general formula (I)

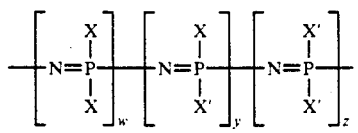
(I)

in which:

X represents substituents deriving from hydroxy- or amino-substituted carbonyl compounds having the following formulas:

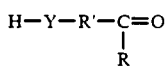

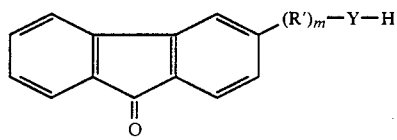

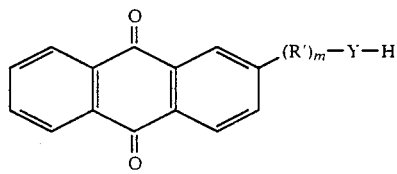

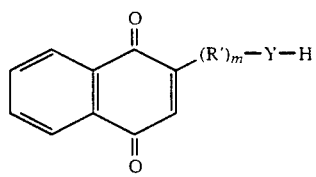

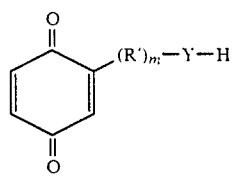

in which:

Y represents —O— or —NH—;

R represents an alkyl group having a straight or branched structure, containing from 1 to 30 carbon atoms, or an aryl group;

R' represents —CH$_2$— or an aryl or heterocyclic group, either substituted or non-substituted;

m is an integer, which can range from 0 to 5;

X' represents additional substituents having one or more variously alkylated tertiary aminic functions, deriving from aliphatic alcohols or amines having straight or branched chains containing 1 to 30 carbon atoms, and containing also variously alkylated tertiary aminic groups of general formula:

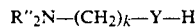

wherein R" represents a methyl, ethyl, propyl, butyl, pentyl, hexyl, heptyl, octyl, etc., having straight or branched chains;

k is an integer which can range from 1 to 30;

Y represents —O— or —NH—;

or deriving from phenols or aromatic amines, substituted in different positions of the ring by variously alkylated tertiary aminic groups, of general formula:

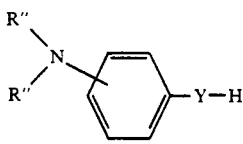

in which

R" and Y are the same as defined hereinbefore;

(w+y+z) is an integer varying from 20 to 15,000;

w and z are integers having a value higher than or equal to zero and at any rate lower than 15,000;

y is an integer having a value ranging from 20 to 15,000.

As it apparent from the above-indicated formulas, the compounds utilized in the preparation of said polyphosphazene derivatives for obtaining substituents X are hydroxy- or amino-substituted carbonyl compounds selected from the group comprising aliphatic, aromatic and alkylaromatic ketones, or quinones; conversely, the compounds utilized to obtain additional substituents X' are selected from aliphatic alcohols or amines, phenols and anilines of various types, variously substituted by tertiary aminic functions containing straight or branched alkyl groups, like or different from one another.

For preparing the polyphosphazene derivatives according to the invention, said compounds are reacted with polydichlorophosphazene of general formula:

wherein n is an integer from 20 to 15,000, either directly or, if said compounds are those with hydroxyl functions, preferably after reaction with sodium hydride. The polyphosphazene derivatives according to the present invention are prepared in accordance with one of the processes indicated hereinafter:

A) In the case that both X and X' should be substituents deriving from compounds containing hydroxyl groups, these compounds, dissolved in proper organic solvents, are reacted with sodium hydride in a stoichiometric amount and the corresponding sodium salts so produced are subsequently (or simultaneously) used in the process for substituting the chlorine atoms of polydichlorophosphazene.

This substitution reaction can be conducted also in the presence of a tetraalkylammonium halide in order to enhance the effectiveness of the substitution process.

B) In the case that X and X' should be substituents deriving from compounds containing hydroxylic or aminic functions, they are reacted with polydichlorophosphazene in the presence of a tertiary amine, which has the task, on one side, to minimize side-reactions and, on the other side, to act as an acceptor of the hydrochloric acid coming from the substitution reaction.

It should be noted that substituent X' already contains by its own a tertiary aminic group, which can exert the same function as the free tertiary amine towards the hydrochloric acid released during the chlorophosphazene substitution reaction.

The polyphosphazene derivatives according to the present invention are synthesized so as to have a value of y as high as possible, and values of w and z as low as possible in order to achieve the maximum effectiveness in the photo-crosslinking process. That means that the number of heterosubstituted phosphazene monomeric units shall be as high as possible in order to permit the photoactive species X to be directly near the tertiary aminic group with which it interacts to form radicals.

The order in which the reagents capable of giving substituents X and X' are reacted with polydichlorophosphazene is determined by the basicity of said substituents. In particular, the substituent having a higher basicity is reacted as first, leaving the one having a lower basicity as second. This contrivance is used in order to prevent exchange reactions of a substituent having lower basicity made to react as first and already linked to the phosphazene chain, with a substituent having a higher basicity, which enters the molecule at a later time.

Furthermore, the substituent which is reacted as first is used in an amount which is exactly equivalent to the theoretic amount of the chlorine it has to substitute, which usually amounts to 50% of that originally available in the polydichlorophosphazene, while the substituent which reacts as second must be used in a strong excess, even of 100% calculated on the theoretical amount, in order to obtain a chlorine substitution as complete as possible.

If both groups X and X' have equivalent basicities, the corresponding compounds can be also dissolved in one solvent only in an equimolar amount and can be reacted together. For the preparation of the polyphosphazene derivatives according to the present invention, the reaction conditions can vary over a wide range as a function of factors such as the reactivity of the compounds which provide substituents X and X', the type of tertiary amine used in the reaction and the substitution degree to be obtained in the final polymer.

Generally, the reaction temperature can vary from 25° to 250° C. and the time necessary to the complete substitution of the chlorine of polydichlorophosphazene can vary from 1 to 7 days; low reaction temperatures involve longer reaction times and, conversely, higher reaction temperatures permit to get shorter reaction times.

The reaction is conducted in an organic solvent or in a mixture of organic solvents, which must be solvents for polydichlorophosphazene, for the compounds which provide substituents X and X' containing hydroxylic functions, for the sodium salts thereof, for the compounds which provide substituents X and X' containing aminic groups, for the tertiary amines and furthermore for the produced polyphosphazene derivatives.

Usually utilized solvents are: diglyme, triglyme, methylene chloride, chloroform, tetrahydrofuran, dioxane, benzene, toluene and xylene. The solvent amount is not critical, and any amount sufficient to fully solubilize the reacting substances can be utilized. Furthermore, the solvents must be completely anhydrous in order to avoid undesirable side-reactions caused by the chlorine atoms of the starting polydichlorophosphazene.

Generally, the amount of aliphatic, aromatic, alkylaromatic ketone, or the amount of quinone, either hydroxy-substituted or amino-substituted, as well as the amount of the additional reagents which provide the X' utilized in the synthesis, shall be at least equivalent to the number of chlorine atoms available in the starting polymer; however, if so desired, it is possible to use an excess of ketone or quinone compounds in order to secure a complete substitution of the chlorine atoms.

The polydichlorophosphazene utilized for preparing the derivatives according to the invention is a high reactive polymer, which is unstable to humidity, has an essentially straight structure and is generally prepared by means of thermal bulk polymerization, under vacuum, starting from low molecular weight cyclic oligomers, such as e.g. hexachlorocyclophosphazene $(NPCl_2)_3$ or octachlorocyclotetraphosphazene $(NPCl_2)_4$ or from a mixture of both.

The tertiary amines utilized for preparing the polyphosphazene derivatives forming the object of the present invention comprise the ones represented by the general formula:

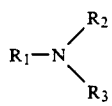

wherein $R_1$, $R_2$ and $R_3$ are each an alkyl containing from 1 to 8 carbon atoms, such as trimethylamine, triethylamine, triisopropylamine, tri-n-propylamine, tri-n-butylamine, but it is possible to use also N-methylmorpholine, N-methylpyrrole and the like, and furthermore tertiary amines such as pyridin, and the ones containing diaminic groups such as N,N,N',N'-tetramethylethylenediamine. Preferably utilized tertiary amines are triethylamine and N,N,N',N'-tetramethylethylenediamine. They are used in a high excess with respect to the stoichiometric amount necessary to neutralize the hydrochloric acid released in the chlorophosphazene substitution process.

The tetrabutylammonium halides act as catalysts in the substitution reaction of polydichlorophosphazene $(NPCl_2)_n$ with the various reagents. The employed halides are tetrabutylammonium iodide, bromide and chloride. Among the halides, tetrabutylammonium bromide is preferably used.

The ketone or quinone compounds utilized in the reaction with chlorophosphazene to provide substituents X are: α-amino-acetone and α-hydroxy-acetone, 4-amino-benzophenone or 4-hydroxy-benzophenone, 4-amino-acetophenone or 4-hydroxy-acetophenone, 4-amino-propiophenone or 4-hydroxy-propio-phenone, 4-amino-valerophenone or 4-hydroxy-valerophenone, 2-amino-fluorenone and 2-hydroxy-fluorenone, 2-hydroxymethyl-anthraquinone, 1- or 2-amino-anthraquinone, 2-hydroxy-naphthoquinone, etc.

The additional reagents which provide substituents X' are:

a) aliphatic alcohols having straight or branched chains containing from 1 to 30 carbon atoms and having, in the chain, variously alkylated tertiary aminic groups, such as for example: 2-N,N'-dimethylaminoethanol or 2-N,N'-diethylaminoethanol; 3-N,N'-dimethylamino-propanol or 3-N,N'-diethylamino-propanol; 4-N,N'-dimethylamino-butanol or 4-N,N'-diethylamino-butanol; etc.

b) aromatic alcohols, such as phenols or naphthols which are variously substituted in the ring by tertiary aminic groups of various nature and complexity and are arranged in different positions in the aromatic ring, such as for example: 3-N,N'-dimethylamino-phenol or 3-N,N'-diethylamino-phenol; 4-N,N'-dimethylamino-phenol or 4-N,N'-diethylamino-phenol; 6-N,N'-dimethylamino-β-naphthol or 4-N,N'-diethylamino-β-naphthol; 6-N,N'-dimethylamino-α-naphthol or 6-N,N'-diethylamino-α-naphthol, etc.;

c) primary and secondary aliphatic amines having straight or branched chains formed by 1 to 3 carbon atoms endowed also with variously alkylated tertiary aminic groups, either the same or different from one another, such as e.g.: 2-N,N'-dimethylamino-ethylamine or 2-N,N'-diethylaminoethylamine; 3-N,N'-dimethylamino-propylamine or 3-N,N'-diethylamino-propylamine; 4-N,N'-dimethylamino-butylamine or 4-N,N'-diethylamino-butylamine; etc.;

d) aromatic amines of the class of aniline or of α- or β-naphthylamine, which are variously substituted in the ring by tertiary aminic groups of various nature and complexity, equal or different from one another, arranged in various positions in the aromatic ring, such as for example: 3-N,N'-dimethylamino-aniline or 3-N,N'-diethylamino-aniline; 3-N,N'-dimethylamino-4-methylaniline or 3-N,N'-diethylamino-4-methylaniline; 3-N,N'-dimethylamino-4-methoxyaniline or 3-N,N'-diethylamino-4-methoxyaniline; etc.; or 4-N,N'-dimethylamino-aniline or 4-N,N'-diethylamino-aniline; 4-N,N'-dimethylamino-3-methylaniline or 4-N,N'-diethylamino-3-methylaniline; 4-N,N'-dimethylamino-3-methoxyaniline or 4-N,N'-diethylamino-3-methoxyaniline; etc.; or 6-N,N'-dimethylamino-β-naphthylamine or 6-N,N'-diethylamino-β-naphthylamine; 6-N,N'-dimethylamino-α-naphthylamine or 6-N,N'-diethylamino-α-naphthylamine; etc.

The polyphosphazene derivatives conforming to the present invention exhibit the advantage, as compared with the known products at present utilized in the common industrial appliances, of having the possibility to vary, to a very wide extent, their chemico-physical properties, and by consequence, also their photoreactivity, by operating as follows:

a) properly varying substituents X by suitably selecting them from the above-indicated classes of compounds;

b) properly varying substituents X' by suitably selecting them from the above-indicated classes of compounds;

c) properly varying the $y/w+y+z$ ratio.

In this manner there are obtained phosphazene copolymers with different characteristics and having properties suitable for various applicative conditions, capable of cross-linking with an effectiveness and rapidity determinable in advance on the basis of the amount of phosphazene monomeric units which are heterosubstituted by X and X' and on the basis of the effectiveness with which the couple of substitutents X and X' is able to produce, under irradiation, reactive radical species.

As regards the use of the polyphosphazene derivatives according to the present invention, they are utilizable in the form of thin, flexible, elastic and adhesive films, which are deposited onto glass or quartz substrate and are subsequently irradiated during variable stretches of time with ultraviolet or visible radiations.

The polymeric film, in the surface area exposed to the radiation, undergoes a cross-linking process induced by the light—the duration of said process varying from a few seconds to a few minutes—, which causes a very high (in a few cases, a total) cross-linking of the polymer in question.

This process for the photo-crosslinking of the phosphazene copolymers according to the present invention is utilizable in the photographic sector as a non-conventional system, i.e. not based on the use of silver halides, for the image reproduction.

In fact, if the polymeric film surface exposed to the light radiation is partially screened by a mask which is not transparent to the incident radiation, the not lighted film portion retains its initial solubility, because it is protected by the abovesaid mask, while the whole remaining film portion undergoes cross-linking. The film portion which remains soluble can be subsequently dissolved by means of proper solvents and removed from the substrate, leaving thereon an image, which exactly reproduces the utilized protective mask. This kind of photo-crosslinking processes are utilizable also in the field of microelectronics for producing printed circuits, in microlithography, and the like.

In order to illustrate, but not to limit the scope of the invention, the following examples are given.

EXAMPLE No. 1

Preparation of a phosphazene copolymer having the following composition: 4-hydroxybenzophenone=75%; 3-N,N'-dimethylaminophenol=25%,

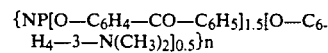

15.0 g (=0.1293 moles=0.2586 eq.) of polydichlorophosphazene were introduced into a three-neck flask having a 1000 ml volume, and they were dissolved under a slight heating in about 100 ml of anhydrous dioxane. 6,828 g of sodium hydride at 60% and 1.5 g of tetrabutylammonium bromide were introduced into another 1000 ml flask and were suspended in about 100 ml of dioxane. A solution of freshly sublimed 3-N,N'-dimethylaminophenol (19.51 g=0.1422 moles), equal to 55% of the whole available chlorine, in 150 ml of anhydrous dioxane, separately prepared in a charging funnel, was added dropwise to said suspension. On conclusion of the addition and also on conclusion of hydrogen evolvement, the suspension was heated at reflux for about 4 hours in order to obtain a thorough reaction of phenol. Then it was filtered very slowly and, under a nitrogen atmosphere, phenate was directly added to the polydichlorophosphazene solution. The whole was maintained under stirring at reflux for 24 hours.

At the beginning of said 24-hour period also the preparation of the 4-hydroxybenzophenone sodium salt was started, so that both the polymer partially substituted by 3-N,N'-dimethylaminophenol and the 4-hydroxybenzophenone sodium salt were ready simultaneously. Into a three-neck flask having a 2000 ml volume there were charged 20.69 g of NaH at 60% (0.5172 moles) and 2 g of tetra-butylammonium bromide and they were suspended in about 200 ml of anhydrous dioxane. Separately, in a charging funnel, 105 g of 4-hydroxybenzophenone were weighted, then they were dissolved in 300 ml of dioxane and were very slowly dropped into the sodium hydride suspension. Hydrogen evolvement was observed. On conclusion of the addition, all the suspension was subjected to reflux for about 24 hours.

At the end of this stretch of time, the suspension of the partially substituted polymer was poured, under stirring, into the suspension of 4-hydroxybenzophenone sodium salt, taking care of transferring thereinto also all the solid blocks of precipitated polymer. The mixture was then heated to 80° C. and was maintained at this temperature during five days. After this time had passed, the polymer was cooled and poured in a water excess. A white solid precipitated, which was dissolved again in THF and re-precipitated in water further two times, dissolved again in THF and re-precipitated in n-heptane twice, dissolved once again in THF and re-precipitated in an ethyl ether/n-heptane mixture at 50%. A white rubber-like polymer was obtained, which was dried under vacuum for 2 days.

A spectrophotometric analysis of the obtained copolymer (carried out on the basis of the assumption that the extinction coefficient of the benzophenone group contained in the homopolymer poly[bis(4-benzoylphenoxy)]phosphazene [$NP(-O-C_6H_4-CO-C_6H_5)_2]_n$ may have the same value also in the copolymers of this type) revealed that the composition found in the polymer (75% of benzophenone groups and 25% of 3-N,N'-dimethylaminophenol groups) was different from the one which was expected (50% of benzophenone groups and 50% of 3-N,N'-dimethylaminophenol groups) on the basis of the reagents amounts utilized in this synthesis.

All the operations for preparing and purifying this copolymer were carried out under darkness conditions or under red light, in order to avoid accidental photoreactions during the handling steps.

EXAMPLE NO. 2

Preparation of a phosphazene copolymer having the following composition: 4-hydroxybenzophenone = 75%, 3-N,N'-diethylaminophenol = 25%,

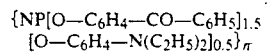

This copolymer was prepared according to the same modalities as are described in Example No. 1, using 3-N,N'-diethylaminophenol instead of 3-N,N'-dimethylaminophenol, adopting also the same contrivances as regards the darkness conditions during both the synthesis and the subsequent purification.

EXAMPLE NO. 3

Photo-crosslinking of the product of Example No. 1 by means of cut off filters.

This copolymer was irradiated in the form of a thin film deposited on glass, using a cut off filter so as to eliminate the incident radiations having wavelengths below 340 nm, operating according to the following modalities.

The thin copolymer film was prepared by slow evaporation to the air of a solution of the polymer in dichloromethane and by vacuum drying for two days. It was then irradiated by a 900 W Xenon lamp, positioning the film at about 30 cm from the light source and interposing the cut off filter between film and lamp.

It is important to point out that, on the basis of spectrophotometric measurements carried out on the polymer film prior to and after irradiation, no appreciable variations in the optical density were observed for all the tested exposure times (up to 10 minutes).

The irradiated polymeric film was then immerged into di-chloromethane and stirred for several days.

The cross-linking degree of the irradiated polymer was determined by measuring the percentage of gel formed under irradiation.

All the handling and storing operations, both of the phos-phasene copolymer solutions and of the corresponding films to be irradiated, were carried out under darkness conditions, or under red light, in order to preserve these materials from accidental photo-crosslinking processes during the handling steps.

The results obtained with this polymer are illustrated in FIG. 1 (Curve 1), which shows the gel percentage as a function of the irradiation time in minutes. From said curve it is apparent that a very high crosslinking of this copolymer is obtainable in about 1-2 minutes of irradiation.

EXAMPLE NO. 4

Photo-crosslinking of the product of Example No. 1 without cut off filters.

The test described in the preceding Example was repeated under the same operative conditions with the only exception that in this case no cut off filters were interposed between polymer film and light source. From the results reported in FIG. 1 (Curve 2) it can be noticed that the crosslinking process occurred in even shorter times as compared with what was observed in Example 3.

EXAMPLE NO. 5

Evaluation of the photo-crosslinking process efficiency as a function of the irradiation wavelength.

The polymer of Example No. 1, spread in the form of a thin film as is described in Example No. 3, was irradiated for equal stretches of time, using, in the various tests, cut off filters having variable wavelengths, in order to check the spectral response of this material.

The gel percentage obtained in these tests as a function of the irradiation wavelength proves that the spectral response of this copolymer ranges from the extreme ultraviolet to about 380-390 nm.

We claim:

1. A process for preparing a photocrosslinked coating of polyphosphazene derivatives on a glass or quartz surface comprising the following steps:

a) depositing onto said glass or quartz surface, a thin, flexible, elastic film consisting of polyphosphazene derivatives containing carbonyl groups and alkylated tertiary amino groups, having the following formula:

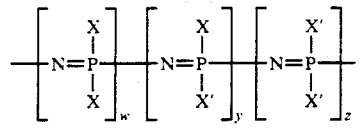

wherein:

X represents a substituent linked to the polyphosphazene chain by means of hydroxyl or amino functions, and containing carbonyl groups selected from the group consisting of

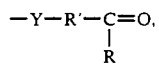

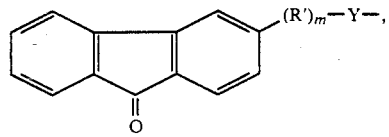

-continued

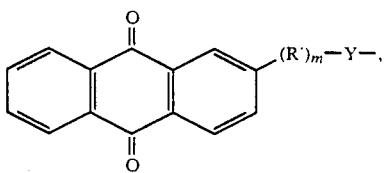

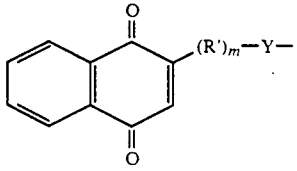

and

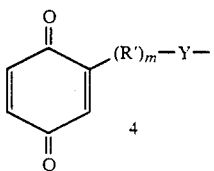

wherein:
Y represents —O— or —NH—;
R represents an alkyl group having a straight or branched chain and containing from 1 to 30 carbon atoms, —$C_6H_5$, or —$C_{10}H_7$;
R' represents —$CH_2$—;
m is an integer that can vary from 0 to 5;
X' represents an additional substituent linked to the polyphosphazene chain by means of hydroxyl or amino functions, and containing one or more alkylated tertiary amino groups selected from the group consisting of $R''_2N-(CH_2)_k-Y-$ and

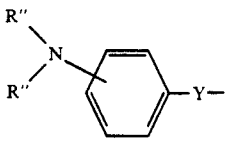

where
R'' represents a methyl, ethyl, propyl, butyl, pentyl, hexyl, heptyl, or octyl group, having straight or branched chains, like or different from one another; and
Y represents —O— or —NH—;
k is an integer of from 1 to 30;
(w+y+z) is an integer varying from 20 to 15,000;
w and z are integers having a value higher than, or equal to, zero, and, at any rate lower than 15,000; and
y is an integer having a value ranging from 20 to 15,000; and
b) exposing said film to ultraviolet or visible radiation.

* * * * *